(12) United States Patent
Packes, Jr. et al.

(10) Patent No.: US 8,447,623 B2
(45) Date of Patent: May 21, 2013

(54) SYSTEMS AND METHODS TO PROVIDE A PRODUCT TO A CUSTOMER BEFORE A FINAL TRANSACTION TERM VALUE IS ESTABLISHED

(75) Inventors: John M. Packes, Jr., Hawthorne, NY (US); Jay S. Walker, Ridgefield, CT (US); Daniel E. Tedesco, New Canaan, CT (US); Stephen C. Tulley, Stamford, CT (US); Keith Bemer, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 348 days.

(21) Appl. No.: 12/228,176

(22) Filed: Aug. 11, 2008

(65) Prior Publication Data

US 2008/0300912 A1 Dec. 4, 2008

Related U.S. Application Data

(63) Continuation of application No. 09/409,041, filed on Sep. 29, 1999, now abandoned.

(51) Int. Cl.
*G06Q 10/00* (2012.01)
*G06Q 30/00* (2012.01)

(52) U.S. Cl.
USPC .......................... 705/1.1; 705/14.1; 705/14.35

(58) Field of Classification Search
None
See application file for complete search history.

(56) References Cited

U.S. PATENT DOCUMENTS

| | | | |
|---|---|---|---|
| 5,319,542 A | 6/1994 | King et al. | |
| 5,426,281 A | 6/1995 | Abecassis | |
| 5,583,760 A | 12/1996 | Klesse | |
| 5,637,846 A | 6/1997 | Boers et al. | |
| 5,642,279 A | 6/1997 | Bloomberg et al. | |
| 5,745,036 A | 4/1998 | Clare | |
| 5,794,207 A | 8/1998 | Walker | |
| 5,845,265 A | 12/1998 | Woolston | |
| 5,873,069 A | 2/1999 | Reuhl | |
| 5,878,211 A | 3/1999 | Delagrange et al. | |
| 6,038,554 A | 3/2000 | Vig | |
| 6,055,519 A | 4/2000 | Kennedy et al. | |
| 6,249,772 B1 | 6/2001 | Walker | |
| 6,516,302 B1 | 2/2003 | Deaton et al. | |
| 6,754,636 B1 | 6/2004 | Walker | |
| 7,502,757 B2 * | 3/2009 | Schmidt | 705/37 |
| 2002/0019794 A1 * | 2/2002 | Katz et al. | 705/37 |
| 2008/0300912 A1 * | 12/2008 | Packes et al. | 705/1 |

OTHER PUBLICATIONS

Charles A. Knapp & Nathan M. Crystal, "Rules of Contract Law", Published by Little, Brown & Co.; Copyright 1993, Section 2-305 at p. 38, 3 pp.

(Continued)

*Primary Examiner* — Paul Danneman
(74) *Attorney, Agent, or Firm* — Fincham Downs, LLC; Magdalena M. Fincham

(57) ABSTRACT

A method for selling a product which allows a customer to comparison search for, and obtain as a part of a purchase transaction, the competitive terms for a product following product acquisition. The method includes conveying the product to the customer prior to at least one transaction term of the sale being finalized, determining a final value of the transaction term, and completing the sale using the final value of the transaction term as a term of the sale.

12 Claims, 10 Drawing Sheets

OTHER PUBLICATIONS

"The Right of Returns; A Holiday Tradition That Could Cost You a Bundle", PR Newswire, Dec. 21, 1998, Financial News Section, 2 pp.
Foreman, Gary, "Buy Now . . . Pay Later"; (http://www.stretcher.com/stories/960422b.html), download date Apr. 15, 1999, 4 pp.
"Hardware Features—Buy Now Pay Later"; (http://www.reserve.co.uk/www/public/catalogue/buynowpaylater.html), download date Apr. 15, 1999, 1 pg.
Kyd, Charles W., "Buy Now, Pay Later", (http://www.inc.com/incmagazine/arhives/08881011.html), download date Apr. 15, 1999, 4 pp.
"Sales: Buy Now, Pay Later is Good Only if it's Interest Free", (http://detnews.com1996/menu/stories/62386.htm), download date Apr. 15, 1999, 1 pg.
"(Jan. 29, 1999) Card Stuff Protection", (http://www.cardweb.com/cardtrak/news/1999/january/29a.html), download date Jul. 20, 1999, 2 pp.
"Sales Circular—How to Get Price Protection", (http://www.salescircular.com/protectp.html), download date Jul. 20, 1999, 4 pp.
"Pricing and Programs", (http://www.presentingsolutions.com/pricingandprograms.html), download date Jul. 20, 1999, 3 pp.
Office Action for U.S. Appl. No. 09/409,041, mail date Jan. 31, 2002, 11 pp.
Office Action for U.S. Appl. No. 09/409,041, mail date Oct. 28, 2002, 11 pp.
Office Action for U.S. Appl. No. 09/409,041, mail date Jul. 16, 2003, 9 pp.
Office Action for U.S. Appl. No. 09/409,041, mail date Mar. 24, 2004, 6 pp.
Office Action for U.S. Appl. No. 09/409,041, mail date Nov. 4, 2004, 6 pp.
Office Action for U.S. Appl. No. 09/409,041, mail date May 19, 2006, 7 pp.
Office Action for U.S. Appl. No. 09/409,041, mail date Jun. 10, 2008, 29 pp.
Office Action for U.S. Appl. No. 11/930,334, mail date Oct. 7, 2008, 10 pp.
"Hardware Features—Buy Now Pay Later"; (http://www.reserve.co.uk/www/public/catalogue/buynowpaylater.html), download date Apr. 15. 1999, 1 pg.

* cited by examiner

500

510

| CUSTOMER IDENTIFIER 511 | CONTACT INFORMATION 512 | PAYMENT IDENTIFIER 513 |
|---|---|---|
| AB-111 | 111 W.222 ST. ANYTOWN, USA | 1111-2222-3333-4444 |
| AB-112 | 222 E. 333 ST. LONDON, UK | 1111-0000-1111-0000 |
| AB-113 | 333 N. 444 ST. TOKYO, JAPAN | 1234-5678-9012-3456 |
| AB-114 | 444 S. 555 ST. SAN JOSE, CA | 1234-1234-1234-1234 |

FIG. 5

SYSTEMS AND METHODS TO PROVIDE A PRODUCT TO A CUSTOMER BEFORE A FINAL TRANSACTION TERM VALUE IS ESTABLISHED

CROSS-REFERENCES TO RELATED APPLICATIONS

The present application is a continuation application that claims priority and benefit under 35 U.S.C. §120 to U.S. patent application Ser. No. 09/409,041 entitled "SYSTEMS AND METHODS TO PROVIDE A PRODUCT TO A CUSTOMER BEFORE A FINAL TRANSACTION TERM VALUE IS ESTABLISHED", filed Sep. 29, 1999, now abandoned.

The subject matter of this application is related to the following co-pending
  (a) U.S. patent application Ser. No. 09/337,906 filed Jun. 22, 1999 and entitled "PURCHASING SYSTEMS AND METHODS WHEREIN A BUYER TAKES POSSESSION AT A RETAILER OF A PRODUCT PURCHASED USING A COMMUNICATION NETWORK", which granted as U.S. Pat. No. 6,754,636 B1;
  (b) U.S. patent application Ser. No. 09/083,345 filed May 22, 1998 and entitled "METHOD AND APPARATUS FOR MANAGING REMOTE VENDING MACHINE TRANSACTIONS" abandoned; and
  (c) U.S. patent application Ser. No. 08/889,503 filed Jul. 8, 1997 and entitled "SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE (as amended)" and granted as U.S. Pat. No. 6,249,772.
Each of the above-referenced applications is incorporated by reference herein in its entirety.

BACKGROUND

The present invention relates to the sale of products (e.g., goods or services) to customers, and more particularly to systems and methods to provide a product to a customer before one or more final transaction term values are established.

When purchasing a product, consumers are generally concerned with obtaining a favorable transaction term, typically a low price. This concern may lead the consumer to postponing a purchase until he or she has had an opportunity to comparison shop for the most favorable transaction term. This search may be further complicated by a number of different transaction terms, such as: an interest or finance rate; a payment schedule (e.g., no down payment required or no monthly payments for six months); and the duration or scope of warranty provisions. These factors may prolong the consumer's search for the best deal. As a result, a business may lose a potential sale to a consumer who is comparison shopping—even when the seller offers competitive transaction terms.

To recover some of these lost sales, some businesses (e.g., sellers) offer some form of "price protection program" whereby a customer is guaranteed to receive the lowest available price for a product within a specified time period, such as thirty days from the date of purchase. The price protection program typically allows the consumer to bring, or mail, to the seller proof of a lower price from a competing product provider. The actual seller may refund the difference between the original price and the competing product provider's price. In some case, an additional amount (e.g., 5%) may also be refunded to the customer. Unfortunately, the initial price associated with the product may delay or deter the purchase, even if the refund is to be made soon thereafter.

Some credit card issuers also provide price protection programs. According to these programs, the original price of the product is initially charged to the customer's credit card account. Within a predetermined period of time, the customer may provide proof to the credit card issuer that the product is available for a lower price. In this case, the difference between the original price and the lower price is credited to the customer's credit card account. This may require the buyer to carry the higher balance over a billing cycle.

Another price protection technique is disclosed in U.S. Pat. No. 5,642,279 to Bloomberg et al. Bloomberg et al. describes a price protection technique by which product prices within a specified geographic area are tracked. For example, consider a consumer who purchases a product for a first price. When that product is advertised at a price lower than the first price within a specified area and time period, a refund check for the amount of the difference between the first price and the advertised price is automatically printed and sent to the consumer. While Bloomberg facilitates the refund process for the consumer in comparison to the aforementioned price guarantee program, the consumer must still initially pay a higher price in order to acquire the product.

What is needed is a purchasing system and method whereby a consumer may acquire a product while paying the lowest price to which he or she is entitled, without having to pay a higher initial sale price and receive a refund at a later time. Also needed is a purchasing system and method which would allow the consumer to acquire a product and later obtain, as a part of the transaction, competitive terms such as a sale price, an interest rate and/or a warranty provision.

SUMMARY OF THE INVENTION

The present invention provides a purchasing system and method whereby a customer may acquire a product from a seller and subsequently search for and receive a more competitive transaction term associated with the product. That is, a subsequently located transaction term value may influence the final transaction term value of the product. The seller can then bill or otherwise charge the customer in accordance with the final transaction term. The present invention provides advantages to the seller in that the customer's concern that the product may be obtained from a competing product provider with a more favorable term, such as a lower price, is reduced, resulting in a higher sales volume for the seller. The present invention also provides advantages to the customer in that the customer may search for and obtain competitive transaction terms for the product, such as the lowest current sale price, without having to postpone acquisition of the product or requiring a subsequent rebate or refund process.

In accordance with one embodiment of the present invention, a purchasing method is disclosed in which a product is provided to a customer prior to finalizing at least one transaction term. A final value of the at least one transaction term is then determined, and the transaction is completed using the final value of the at least one transaction term as a term of the transaction.

According to another embodiment, a purchasing system is presented which includes at least one point of sale (POS) terminal coupled to a central server. The at least one POS terminal includes an input device, such as a bar code reader configured to accept product information identifying a product. The central server includes a data storage device which stores a transaction term default value associated with the identified product. The central server further includes a processor coupled to a network interface and the data storage device. The network interface is configured to receive, after conveyance of the product, an override value of the transaction term default value associated with the product. The processor retrieves the transaction term's default value and replaces it with the received override value.

The present invention will be more fully understood when considered in light of the foregoing drawings and detailed description.

BRIEF DESCRIPTION OF THE DRAWINGS

FIG. 5 is a tabular representation of one embodiment of the customer database shown in FIG. 2D.

DETAILED DESCRIPTION

Definitions

Figure 1A:
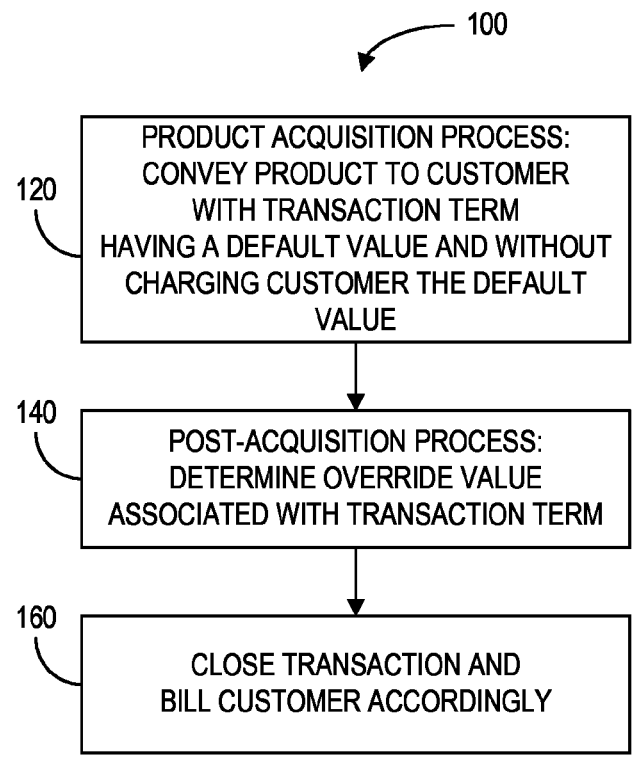
FIG. 1A is a flow chart illustrating one embodiment of a purchase transaction process in accordance with the present invention.

As used herein, the term "product" refers to any good or service provided to a "customer." The term "customer" (as well as "purchaser," "buyer" and "consumer")

refers to any person, business, or other entity that receives the product.

The term "seller" as used herein refers to any person, business, or other entity that conveys or authorizes the conveyance of the product to the customer.

As used herein, the term "purchase transaction" refers to a transaction for the sale or lease of a product between the customer and seller in a retail, wholesale, or other commercial environment.

As used herein, "transaction term" refers to any parameter of the purchase transaction. Some examples of transaction terms include, but are not limited to: a sale price; an interest rate associated with the sale of a product purchased on credit; a duration or scope of a warranty provision; and an amount of time before a first payment becomes due. With respect to a product that is a server, some examples of transaction terms include, but are not limited to: a service price; a service duration; and a scope of service.

The terms "value" and "transaction term value" as used herein refer to a specific amount, quantity, scope or duration of a transaction term. For instance, if the transaction term is a sale price, the value or transaction term value refers to the specific sale price amount. Likewise, if the transaction term is a warranty provision, the value may refer to, for example, the specific scope or duration of the warranty.

The term "default value" as used herein refers to an initial value of a transaction term that will be used as a final value for a transaction term if no appropriate "override value" is received. One example of a default value may be the retail price of a product. In some cases, the default value is defined by the seller prior to initiating a purchase transaction.

The term "override value" as used herein refers to a value received after a customer takes possession of a product but before a transaction for the product has been finalized, such as a value received from the customer, that may be used as a final value for a transaction term.

The term "current value" as used herein refers to a value that will be used as a final value for a transaction term if no further override values are received. The current value may be a default value or an override value, depending on whether an override value has been received.

The term "final value" as used herein refers to the value that is actually used as a transaction term.

For example, consider a customer that takes possession of a television at a location of a seller according to one embodiment of the present invention. If the retail price for the television at the seller is $200, the $200 may then be considered to be the "default" price (and the current price of the television). If the customer later determines that the same model television is available at another location for $190, the $190 price may be submitted to the seller as an "override" price. The "current" transaction price associated with the television may now be set to $190. If no other override price is received by the seller, the "final" price of the transaction (i.e., the sale of the television) will be $190.

The term "offer period" as used herein refers to the period of time during which an override value may replace the current value. The offer period may be a predetermined period of time or may be, according to some embodiments of the present invention, variable (e.g., based on the customer, the product and/or a payment provided by the customer).

The phrase "seller-defined" transaction term as used herein refers to any transaction term defined by the seller, including, for example, a retailer, manufacturer or provider of a product.

Purchase Transaction Methods

Referring to FIG. 1A, a purchase transaction method 100 initiated and completed in accordance with the present invention includes a product acquisition process 120, in which the customer takes possession of the product subject to a transaction term having a default value, such as a retail price, and a post-acquisition process 140, in which the customer is allowed to provide a different (e.g., more competitive) override value for the transaction term. When an override value is determined for one or more transaction terms (e.g., the customer, seller or another party determines a lower sale price), the override value may replace the default value associated with the specific product during the post-acquisition process 140. At the conclusion of the post-acquisition process 140, the transaction terms are closed and the provided override value become the final transaction term value of the purchase at 160. If no override value has been received, the default value becomes the final transaction term value. The customer may then be billed or otherwise charged according to the final transaction term value.

Although embodiments of the present invention are described with respect to a seller determining the final value of a transaction term for a customer (e.g., by locating override transaction terms or by receiving override transaction terms from the customer), it will be appreciated that any party may perform such a determination. For example, a credit card issuer may determine the final value of a transaction term, such as the final price to be charged to a customer's financial account (e.g., credit card account, debit card account or debit account).

The present invention may be used in a variety of ways to increase profits. A seller may use the present invention, for example, increase overall sales activity. According to another embodiment of the present invention, the seller may charge a fee for participation in the plan, for example, in order to recover operational costs associated with the system. In another embodiment, the system and method may be selectively implemented with respect to particular products with or without charge in order to increase the sales volume associated with the product. According to another embodiment, the system and method may only be available to frequent shoppers. Transaction term values, such as the sale price or offer period, may be made more favorable to the customer in order to facilitate the sale of additional product inventory. Further, the selectivity with which transaction term values can be modified may allow the seller to more precisely control sales activity associated with each product and/or category of product.

Figure 1B:
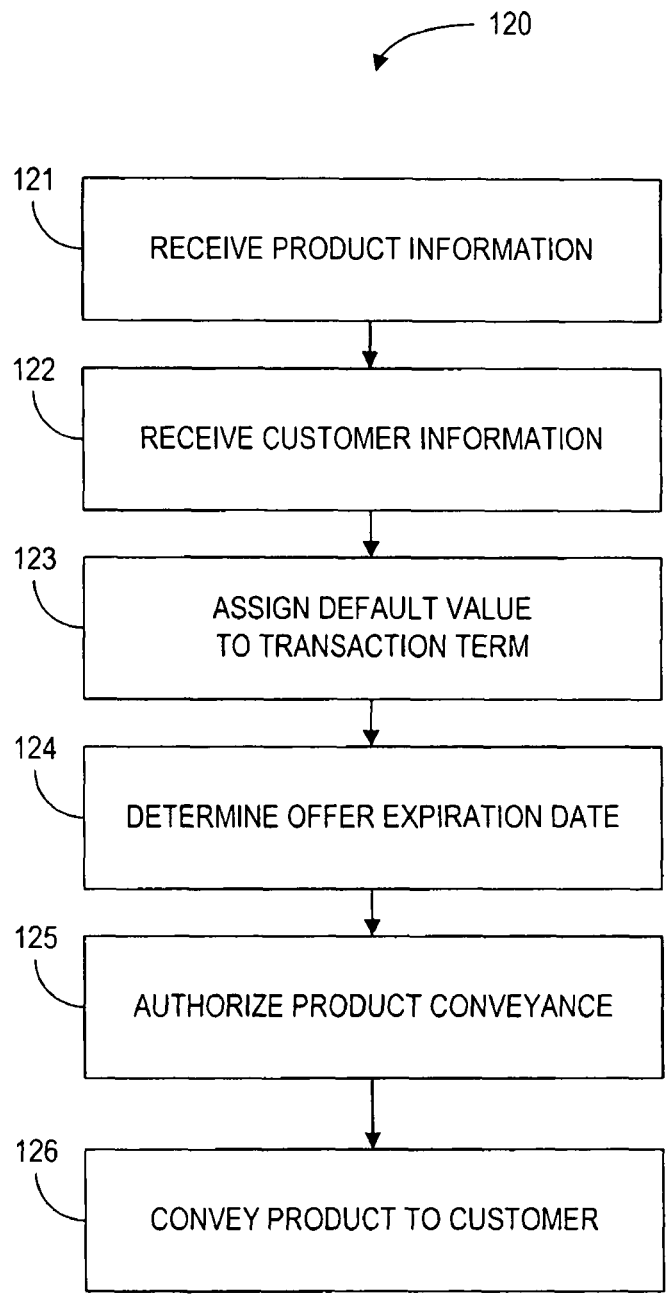
FIG. 1B is a flow chart illustrating one embodiment of the product acquisition process shown in FIG. 1A.

FIG. 1B illustrates one embodiment of the product acquisition process 120. Initially at 121, product information identifying the product is received by the system of the present invention. This may be performed by scanning the product's UPC code using a bar code scanning system such as the SYMBOL SPARK™ LS 1000 manufactured by the Symbol Technologies, Inc. of Holtsville, N.Y. In an another embodiment, this may be performed using, for example, a computer peripheral, such as a mouse or other input device, to select information corresponding to the desired product from one or more groups of information displayed on a computer monitor. Other input devices which may be used include an alphanumeric keyboard, a touch sensitive monitor such as those manufactured by Touch Controls, Inc. of Fallbrook, Calif., an Interactive Voice Response Unit (IVRU) such as those manufactured by Missing Link, Inc. of Suffield, Conn., a pen pointer, a track-ball, a facsimile machine, a Personal Digital Assistant (PDA) such as those manufactured by the 3COM® Corporation of Santa Clara, Calif., or other input devices by which the selected product may be identified to the system of the present invention.

At 122, customer information is received by the system. Customer information may include, for example, the customer's name, address, telephone number, and/or a store-specific identifier such as a "frequent shopper" account number.

Customer information may further include a payment identifier such as an account number corresponding to a checking, credit, debit, or ATM card account or other financial account of the customer. This information may be used, for example, to arrange to receive payment from the customer of an amount based on a final price (e.g., a default price or an override price) determined after an offer period (e.g., the date on which all transaction terms will be finalized). Other identifying information may also be received by the system in order to ensure that the customer will eventually provide payment for the product. Other identifying information may include, for example, the customer's Social Security number and/or driver's license information.

According to an embodiment of the present invention, the system may also verify some or all of the received customer information. For example, the system may verify that that a credit card (or other financial account) number is associated with an active credit card (or other financial) account by querying a remote database of active account numbers in a known manner.

At 123, a default value (e.g., the seller's retail price or interest rate) is assigned to at least one transaction term of the purchase. In one embodiment, the default values are predefined for each product within the seller's product database, further described below with respect to FIG. 4. In another embodiment, the default values may be entered by an authorized employee following the receipt of product information. Other transaction terms may also be used. For example, the seller's warranty provisions or an amount of time before a first payment becomes due may be used. The system and method of the present invention can be configured to process any transaction term that may be associated with a purchase of a product.

At 124, a date on which all transaction terms will be finalized, or "offer expiration date," is determined. The offer expiration date may be based on, for example, the current date (e.g., the transaction terms will be finalized two weeks from the current date) or a predetermined date (e.g., the transaction terms will be finalized at the end of the year). According to one embodiment, an offer expiration time may also be determined (e.g., the transaction terms will be finalized at 2:00 PM on the offer expiration date).

At 125, product conveyance to the customer is authorized. In one embodiment, the system may confirm that a credit card account associated with the customer has sufficient credit to cover the default price of the product. In another embodiment, authorization includes confirming a supply of the specific product.

According to still another embodiment of the present invention, product information may be confirmed, for example, by comparing a received UPC code with one or more stored UPC codes of products the seller has in inventory. A match between the received and stored codes may then confirm that the scanned product, and the product may then be conveyed.

Customer information may be similarly confirmed by comparing the received customer information, including a payment identifier, with stored customer information. In one embodiment, the seller may: (i) verify the existence of a credit card or other payment account corresponding to the payment identifier; and/or (ii) place a hold on an amount of funds in the customer account in order to verify the customer's ability to provide payment. The confirmation process for new customers may include, for example, comparing a portion of the received customer information, such as the customer's driver's license number, to information stored in a public records database in order to verify the customer's identity. Confirmation of a new customer's payment identifier and/or Social Security number may be accomplished by accessing corresponding information stored in a remote credit reporting database, such as those maintained by EQUIFAX or TRW, and comparing the information with the payment identifier and/or Social Security number previously provided.

Once the received product and/or customer information has been verified, the conveyance authorization process may be concluded and the product may be conveyed to the customer at 126. In one embodiment, this occurs by deactivating an egress control device affixed to the product, an example of which is further described below. In another embodiment, authorization is concluded by generating a printed or electronic receipt verifying the current transaction term value or values. Once authorization is completed, the customer may take possession of the product (or, in the case of a service, receive the service).

Figure 1C:
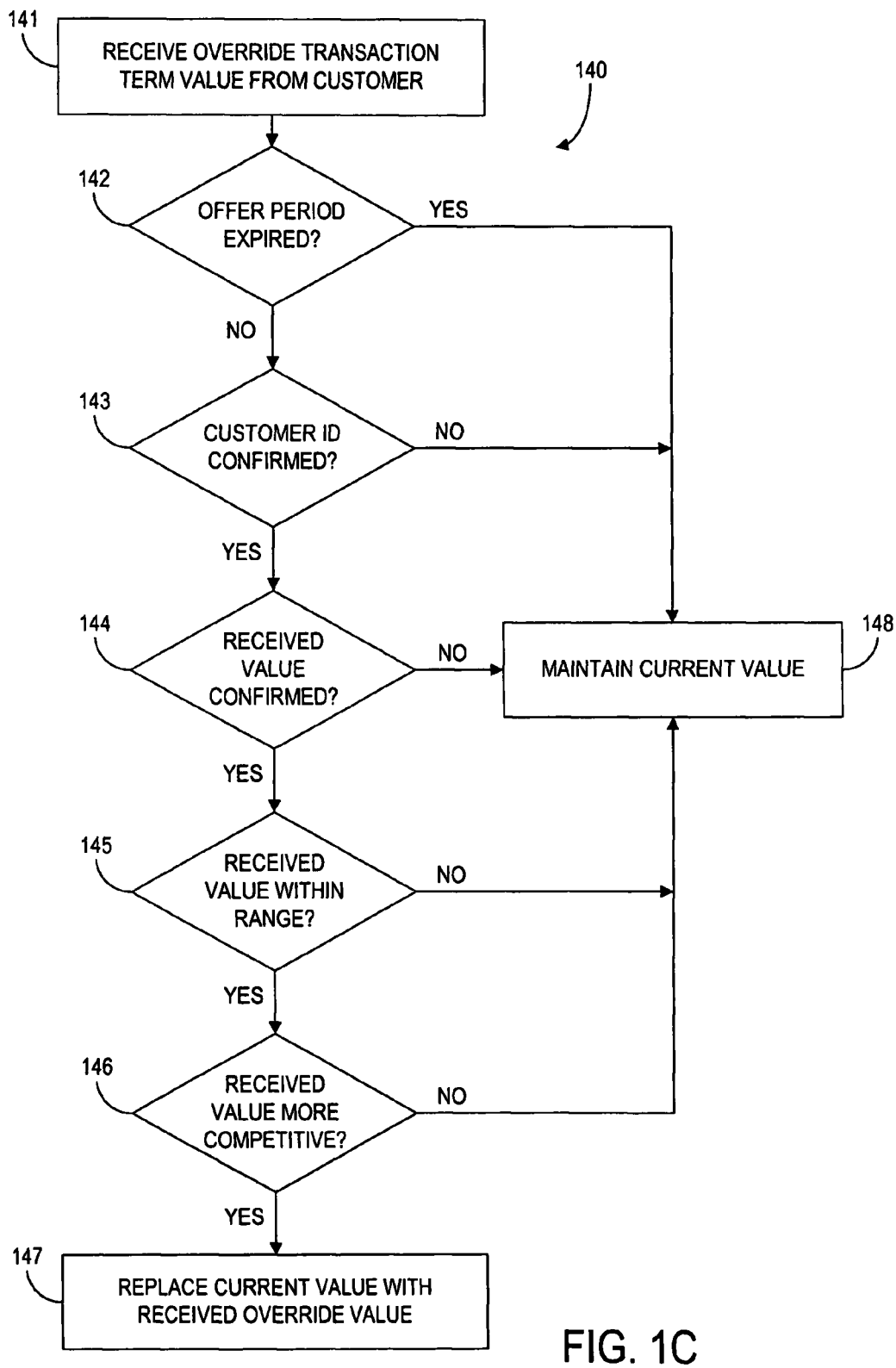
FIG. 1C is a flow chart illustrating one embodiment of the post-acquisition process shown in FIG. 1A.

FIG. 1C illustrates an embodiment of the post-acquisition process 140. In one embodiment, the post-acquisition process 140 remains active over an offer period during which lower prices, lower interest rates, or other more favorable transaction term values may replace the default or previously established value. The offer period may expire, for example, at a set time (e.g., a time after conveyance or a pre-established date, regardless of when the product was conveyed) after conveyance occurs, for instance two weeks. According to another embodiment, the duration of the offer period may be extended or shortened in exchange for an increase or decrease in fees charged, respectively. According to other embodiments, an offer period may be based on a billing cycle, a special promotion offered by the seller or a product season (e.g., the entire summer for a jet ski). It should be noted that not all of the transaction terms need to be variable in the present invention. For example, one or more transaction terms may be fixed at the conclusion of the product acquisition process 120.

Note that a customer may, according to an embodiment of the present invention, lock in a retail price such that the price will not increase based on, for example, increased demand. That is, the customer may submit an override value to receive a more favorable transaction term value, but the seller will not automatically replace a default transaction term value with a less favorable transaction term value (e.g., when the seller raises the retail price associated with an item before the transaction terms are finalized).

The post-acquisition process 140 begins at 141 when the seller receives an override transaction term value and customer information. The received override transaction term value may consist of a lower price, a lower interest rate, a longer warranty period or greater scope of warranty protection, or a combination of these or other transaction term values that the customer finds more competitive. Such an override transaction term will typically be associated with a competing product provider. The override transaction term may also be associated with the seller that originally provided the product to the customer (e.g., the seller may subsequently lower the product's retail price).

In one embodiment, the override value may originate from a customer who actively locates a more competitive term. In another embodiment, the seller, upon processing the transaction in accordance with the present invention, initiates a search for competing terms from one or more databases, which may store all or some competing product provider's terms. According to another embodiment of the present invention, the seller may also compare its own retail prices with the default terms. For example, if the seller lowers the price of a television, a customer that took possession of the television one week ago may have the seller's lower price used as an override value. In a further embodiment, the override value may originate from a third party which has been requested to locate a more competitive term on behalf of the customer. Such a service is offered, for example, via a Web site provided by SalesCircular Inc.

At 142, a determination is made as to whether the override value was received before the offer period expired (i.e., within the offer period). In one embodiment, the offer period may be established or extended in exchange for a fee paid by the customer. According to another embodiment, the offer period may be shortened in exchange for a reduction in the sale price. If the override value is received within the predefined time period, the process continues at 143. If not, the current value corresponding to the transaction term, which may be the default value, is maintained at 148 (e.g., remains unchanged).

At 143, a determination of whether the customer's identity is confirmed is made. This may be performed using known verification techniques, such as requesting and receiving some or all portions of the customer information previously requested at 122 above (FIG. 1B), and comparing that information with previously stored customer information. In one embodiment, the customer may provide a coded customer identifier, further described below, which uniquely identifies the customer. Once the customer's identity has been confirmed, the process continues at 144. If the customer's identity is not confirmed, the current value of the transaction term is maintained at 148.

At 144, the received override value may optionally be confirmed. For instance, the seller may receive a notification from the customer identifying for example, a lower sale price. The seller may in turn verify the price either by contacting a competing product provider directly or by comparing the received sale price with the current prices offered by competing product providers as stored within one or more databases.

The confirmation process may be initiated and completed from a remote location electronically. In one embodiment, the customer may log on to the seller's Web site and transmit a notification to the seller indicating the competing product provider's sale price along with the competing product provider's Uniform Resource Locator (URL) address. The seller may then access the competing product provider's Web site using the supplied URL to locate and verify the received override price.

According to another embodiment of the present invention, the seller, customer or authorized third party may use a networked comparative pricing service such as mySimon™ to search the Internet for prices associated with other product providers. Other possibilities include sending the seller a physical or electronic coupon, advertisement or receipt which identifies the product, the lower price, and the competing product provider. Similarly, the seller may receive an encrypted code representing the product price and/or competing product provider. Such codes may make it difficult for a customer or competing product provider to forge a transaction term (e.g., an artificially low price for a product). The system may be configured to automatically execute the verification process once a value is received, or the system may periodically check for customer notifications (such as notifications sent via e-mail) before the confirmation process is completed.

Confirmed prices and other transaction term values may be subsequently stored in the registration database, described below with respect to FIG. 3, in order to track competing product providers' terms and to verify subsequently received values. If the override value is not confirmed, the current value associated with the product previously conveyed remains unchanged at 148. As described above, transaction term values other than product price may be received from the customer and confirmed by the seller using the aforementioned or other processes. Once the override value is confirmed, the post-acquisition process 140 continues at 145.

At 145, a determination may be made as to whether the received transaction override value is above or below a predefined limit, or within a predefined range. In an embodiment in which a lower override price is received, a determination may be made as to whether the received price value is above a minimum price for which the seller is willing to sell the product. According to other embodiments, higher and/or lower value limits for the interest rate, scope and duration of warranty protection or other transaction terms may be included to limit the extent to which the transaction term value can be varied. If the received override value is not within a predefined range, the current value is maintained at 148. According to another embodiment of the present invention, the default value may be set to the minimum (or maximum) value within the predefined range.

At 146, a determination may be made as to whether the received override value is more competitive than the default value. This may be accomplished, for instance, by comparing a received override price for the product with the default price to determine if the received override price is lower. If the received override value is more competitive (e.g., a lower price or a longer warranty) and all of the aforementioned conditions are met, then the received override value may replace the current value at 147. If the received override value is not more competitive, the process 140 continues at 148 where the current value is maintained.

The post-acquisition process 140 may be designed to terminate with the first completion of steps 141-147, permitting the customer only a single opportunity to provide a more competitive transaction term. In another embodiment, the customer is allowed two or more opportunities to provide more competitive override terms, in which case the process returns to 141 where steps 142-147 are subsequently repeated. If the method 140 permits multiple opportunities to provide competitive terms, the process at 146 involves comparing the latest received override value to the current value, which may be either the default value or a previously received value. If the latest override value is more competitive than the current value, the system may replace the current value and continue the process as described above. In another embodiment, the default and all received override values are stored and a comparison is made between the default and override values. In this instance, 147 and 148 may not be implemented since the default and previous override values are not replaced or updated in substantially real time. Rather, comparisons are made, for example, at the end of a predefined time period.

The process may be performed either locally at the seller's establishment, remotely therefrom, or a combination of both. For example, a remote shopper may log onto the seller's Web site via the Internet and browse through an online catalog of products. The customer may enter product information and customer information, and arrange product shipment to a supplied address. The seller then sends an electronic receipt or e-mail to the customer confirming the purchase transaction. The customer may take delivery of the product subject to the default transaction terms associated with the particular product. In another embodiment, the seller may make arrangements to provide the product at a store in the customer's vicinity once conveyance is authorized. This process is more completely described in commonly-owned U.S. patent application Ser. No. 09/337,906 filed Jun. 22, 1999 entitled "Purchasing Systems and Methods Wherein a Buyer Takes Possession at a Retailer of a Product Purchased Using a Communication Network."

Once the product is shipped or the customer takes possession at a local store, the customer may search for a competing product provider's terms using the Internet or any other source (including advertisements, catalogs, etc.). The competing product provider's terms can then be submitted to the seller as override values. For example, the customer may visit or telephone the seller to provide the override value. The customer may instead send a message indicating the override value, such as an e-mail, a facsimile or a regular mail message, to the seller. When the offer period elapses, the seller may transmit an electronic receipt to the customer confirming the final transaction terms and bill or otherwise charge the customer accordingly. In this or a similar manner, the present invention may be practiced remotely without the customer having to actually visit the seller's physical establishment.

Purchasing System Architecture

Figure 2A:
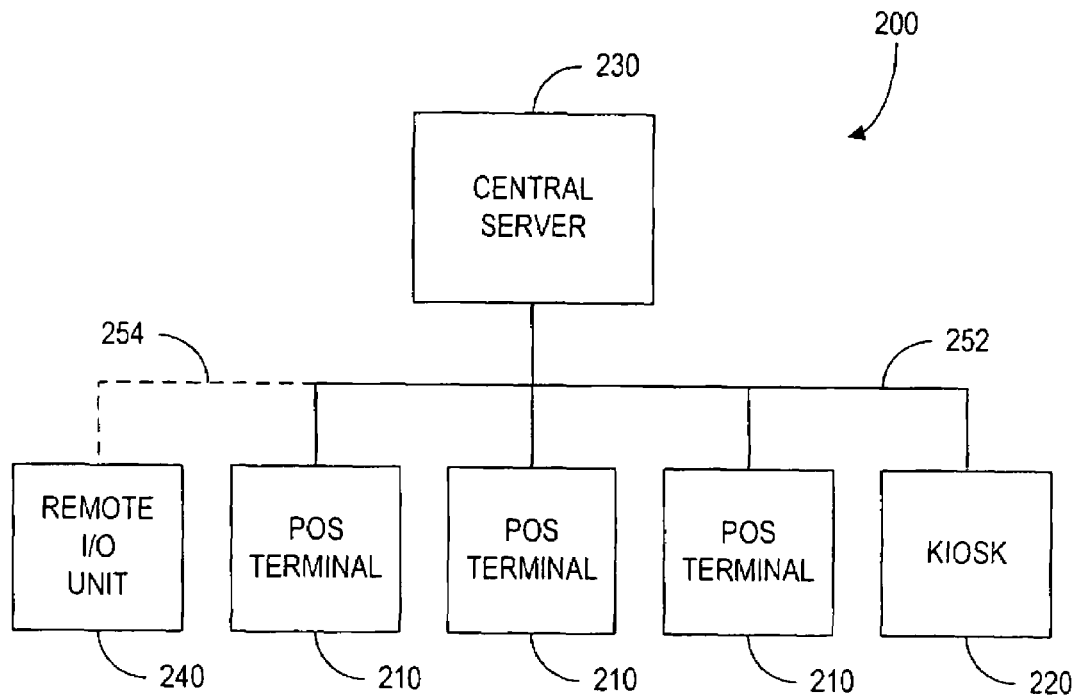
FIG. 2A is a block diagram illustrating a purchasing system in accordance with one embodiment of the present invention.

FIG. 2A illustrates a system block diagram of the purchasing system 200 used to perform the processes of FIGS. 1A-1C. System 200 includes one or more employee-assisted point-of-sale (POS) terminals 210, one or more customer-operated Kiosks 220, and a central server 230. A LAN backbone 252 or other network links the central server 230 with the POS terminals 210 and a kiosk 220. The LAN backbone 252 may consist of any communication media (such as 100BASE TX, FX, or T4 Ethernet or a wireless bus system such as those offer by BreezeCOM, Inc. of Carlsbad, Calif.). In instances where the customer wishes to remotely search for and/or transmit competing product provider's terms, a remote network 254 such as the Internet or a Public Switched Telephone Network (PSTN) may be used to communicate with the customer via a remote input/output (I/O) unit 240.

Figure 2B:
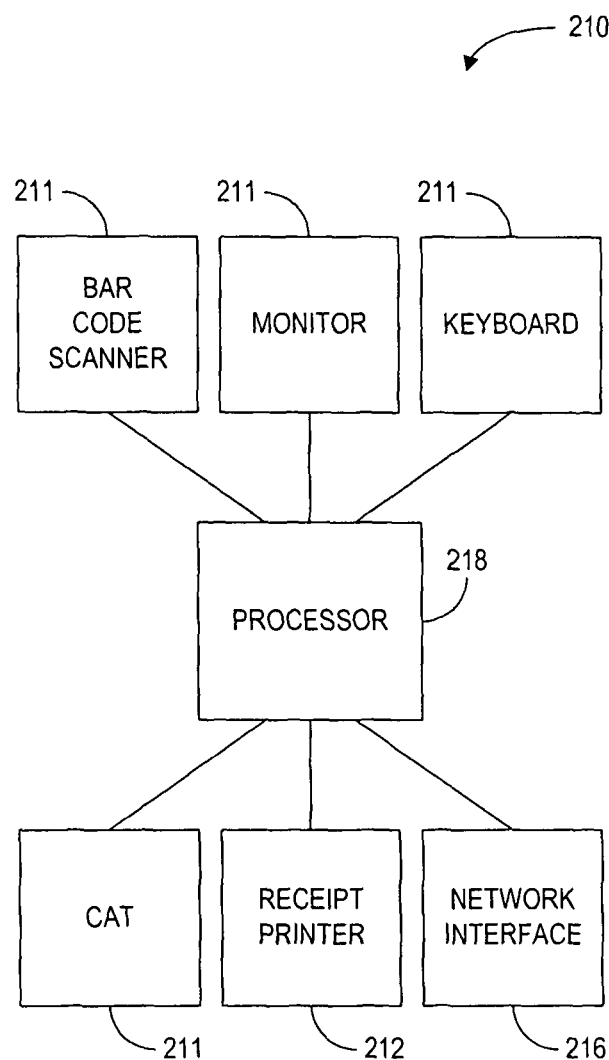
FIG. 2B is a block diagram illustrating one embodiment of the POS terminal shown in FIG. 2A.

FIG. 2B illustrates a block diagram of a POS terminal 210 shown in FIG. 2A. In this embodiment, POS terminal 210 is an employee-assisted terminal where customer and product information is entered, and a record of the transaction is created once the purchase transaction is made. POS terminal 210 includes input devices 211, such as a Card Authorization Terminal (CAT), a bar code scanner, a touch screen monitor, and/or a keyboard which are configured to accept product and customer information, as described above. Customer and/or product information may be entered by the customer and/or an employee. Transaction term information such as the product's default price, interest rate, or warranty provisions, is typically entered by an authorized employee or retrieved from a database maintained by the seller.

POS terminal 210 may also be equipped with a receipt printer 212 for supplying a product receipt to verify that the transaction has been made. The product receipt may include, for example: registration, product, and/or customer information (e.g., a customer identifier or payment identifier); a summary of the transaction terms; a default transaction term value; an indication when an offer period will expire; and/or a URL address of the seller's Web site or a phone number that may be used to submit override values.

According to another embodiment, the receipt terminal may dispense a product marker (e.g., a sticker or other indicia which verifies that the transaction has been authorized in accordance with the default transaction terms). The receipt may further include an electronic file which can be stored on a medium such as magnetic stripe or smart card such as those manufactured by Smart Card Solutions, LLC of Hartland, Wis. Further, the receipt information may be uploaded or transmitted to a customer device, such as a PDA. In embodiments where it may be necessary, the printed or electronic receipt may be used to establish a procedure by which customers are required to show an authorization record including the product or electronic receipt, product sticker, or other indicia in order to exit the seller's facility while in possession of a product.

POS terminal 210 may further include a network interface 216 for communicating with the central server 230. In one embodiment, the network interface 216 includes a Network Interface Card (NIC) such as the FAST ETHERNETLINK™ NIC card manufactured by 3COM® Corporation. In an embodiment in which the LAN back bone 252 consists of a wireless bus, the network interface 216 includes a wireless station adapter such as model number SA-10 PRO.11 or SA-40 PRO.11 manufactured by BreezeCOM, Inc. of Carlsbad, Calif. POS terminal 210 further includes a processor 218, such as an INTEL® Pentium processor, which directs and controls the operation of the POS terminal 210.

Figure 2C:
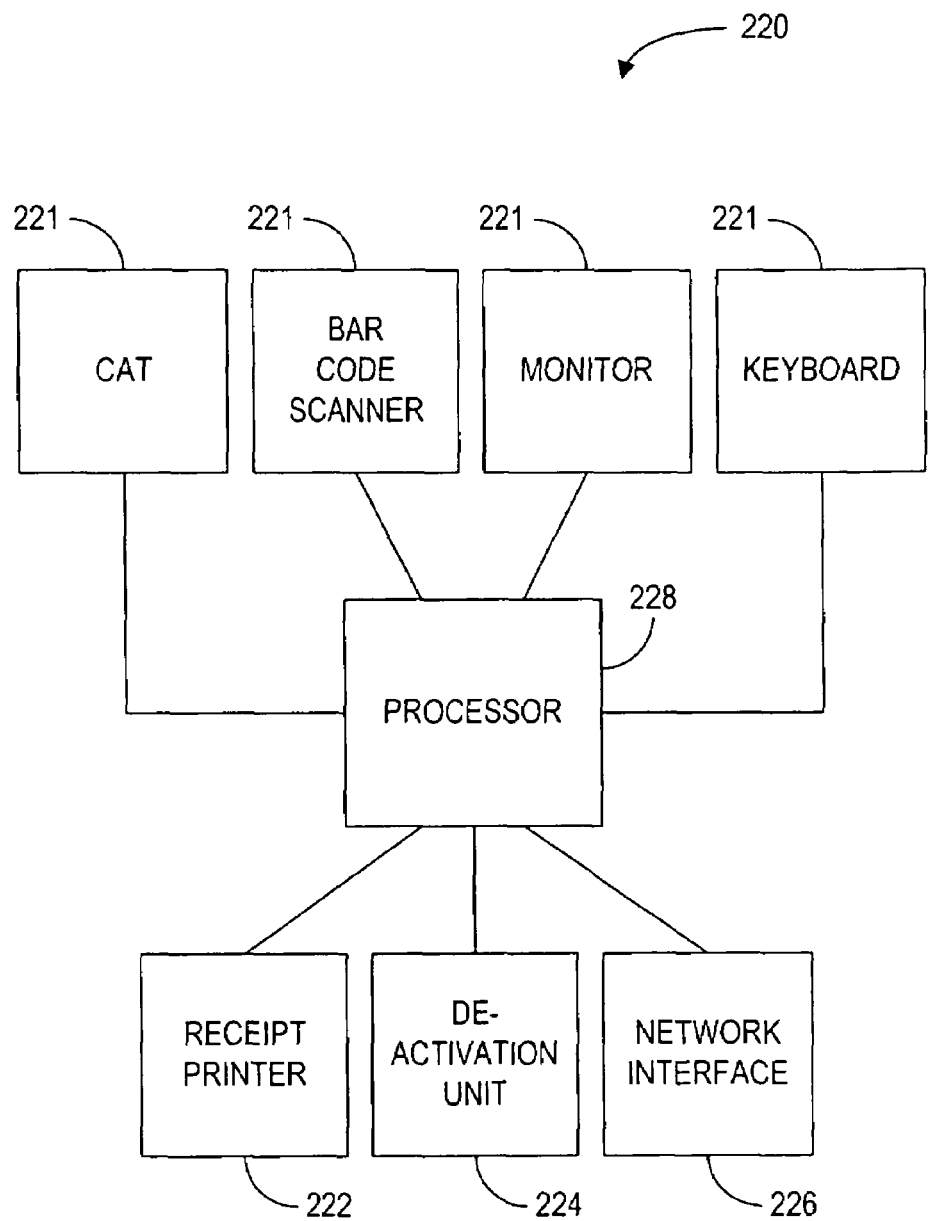
FIG. 2C is a block diagram illustrating one embodiment of the customer-operated kiosk shown in FIG. 2A.

FIG. 2C illustrates one embodiment of a customer-operated kiosk 220, which may be implemented in order to reduce the need for employee assistance. The kiosk 220 may be similarly equipped as the POS terminal having one or more input devices 221, receipt printer 222, network interface 226, and processor 228. Other equipment configurations are also possible. The kiosk 220 may include additional devices to allow employee-free verification of purchase transactions. For instance, the CHAMELON® system offered by the RuMe Corporation of Farmingdale, N.Y. provides a Radio Frequency (RF) tag which is affixed to each controlled product. The RF tag activates an alarm when the product's removal from the facility is attempted. In facilities employing the CHAMELON® or a similar system, kiosk 220 may include a deactivation unit 224 which deactivates the product's RF tag once the purchase transaction has been authorized. POS terminal 210 may also include the deactivation unit 224.

The kiosk 220 may be automated to perform the product acquisition processes shown in FIG. 1B without employee input. In one embodiment, kiosk 220 performs the processes of receiving the customer and product information entered by the customer, displaying default values associated with the selected product for the customer's approval, verifying payment information, deactivating the product's egress control device or outputting an authorization record upon the customer's approval of the transaction. The kiosk 220 may be automated and networked with remote I/O unit 240 to perform the post-acquisition process illustrated in FIG. 1C.

Figure 2D:
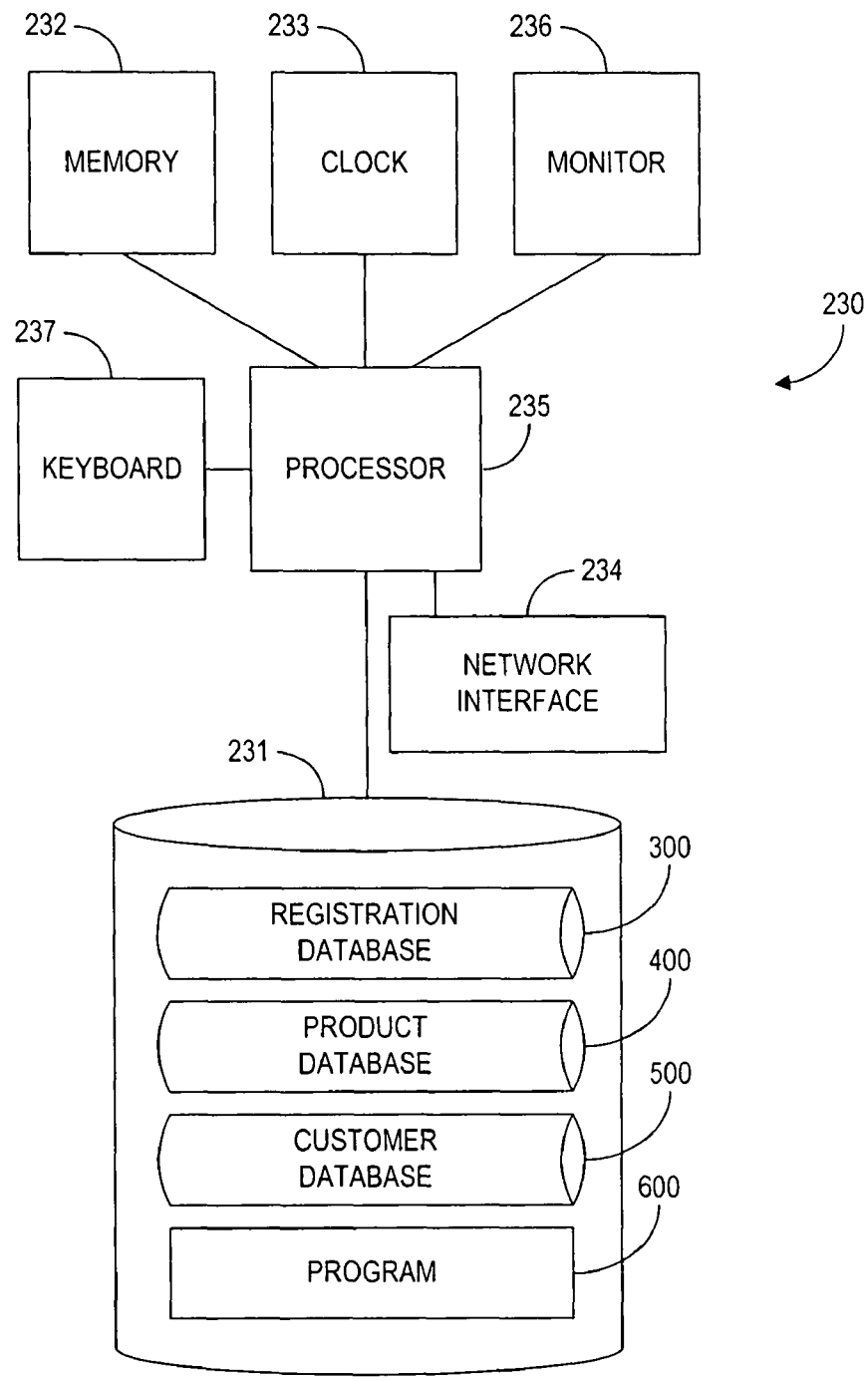
FIG. 2D is a block diagram illustrating one embodiment of the central server shown in FIG. 2A.

FIG. 2D illustrates a block diagram of the central server 230 shown in FIG. 2A. Central server 230 includes a data storage device 231, memory 232, a clock 233, a network interface 234, a processor 235, and one or more input and/or output devices such as a monitor 236 and/or a keyboard 237.

Data storage device 231 is operable to store a registration database 300, a product database 400, a customer database 500, and a program 600, each further described below. Memory 232 is provided to store temporary and operating system data and files associated with the operation of the purchasing system 200. Memory 232 may consist of any memory type, examples including Random Access Memory (RAM) and Read Only Memory (ROM). Clock 233 may be utilized to maintain synchronization with system functions and to determine when the aforementioned offer period expires. Network interface 234 may consist of a network interface card or wireless station adapter for interconnection to the backbone LAN 252. In one embodiment, network interface 234 provides a TCP/IP connection coupled to the remote network 254 for communicating with the remote I/O unit 240. Processor 235 may comprise, for example, an INTEL® Pentium processor. The processor 235 receives computer instructions from software program 600 and controls the purchasing system 200 to perform the processes illustrated in FIGS. 1A-1C. An output device such as a monitor 236 may be implemented as part of the central server 230 to display information pertaining to previous and/or present transactions. A local input device such as a keyboard 237 may also be used to enter transaction terms, values, and other information.

The purchasing system 200 may optionally use a remote network 254 in communication with a remote I/O unit 240 to permit the customer to remotely perform the processes of FIGS. 1A-1C, as described above. In one embodiment, the remote I/O unit 240 consists of a computer workstation which may be used by the customer to access the seller's Web site via the Internet. The customer may browse the seller's product catalog online, select a product, and enter the product and customer information using the computer terminal's input device, such as a mouse and/or keyboard. The transaction may be made subject to the seller's default terms, authorization to convey the product may be completed, and the seller may make arrangements to ship the product based on information supplied by the customer.

After product conveyance is authorized, an electronic confirmation may be sent to the customer's e-mail account in order to confirm the transaction. The customer may subsequently browse the Internet or other networks for more competitive terms and notify the seller upon locating one or more transaction terms of a more favorable nature. Once the seller confirms the term value associated with, for example, a competing product provider, the current or default transaction term may be updated. When the offer period expires, the transaction term may be closed and the customer may be billed or otherwise charged according to the received competing term. The seller may then transmit an electronic receipt to the customer confirming the final transaction terms.

The data storage device 231 of FIG. 2D includes a registration database 300, a product database 400, a customer database 500, and a software program 600. The registration, product, and customer databases 300, 400, and 500 store registration, product and customer records, respectively, for each transaction made. System program 600 contains computer-readable code which directs processor 235 to control the purchasing system 200 to perform the processes illustrated in FIGS. 1A-1C.

Figure 3:
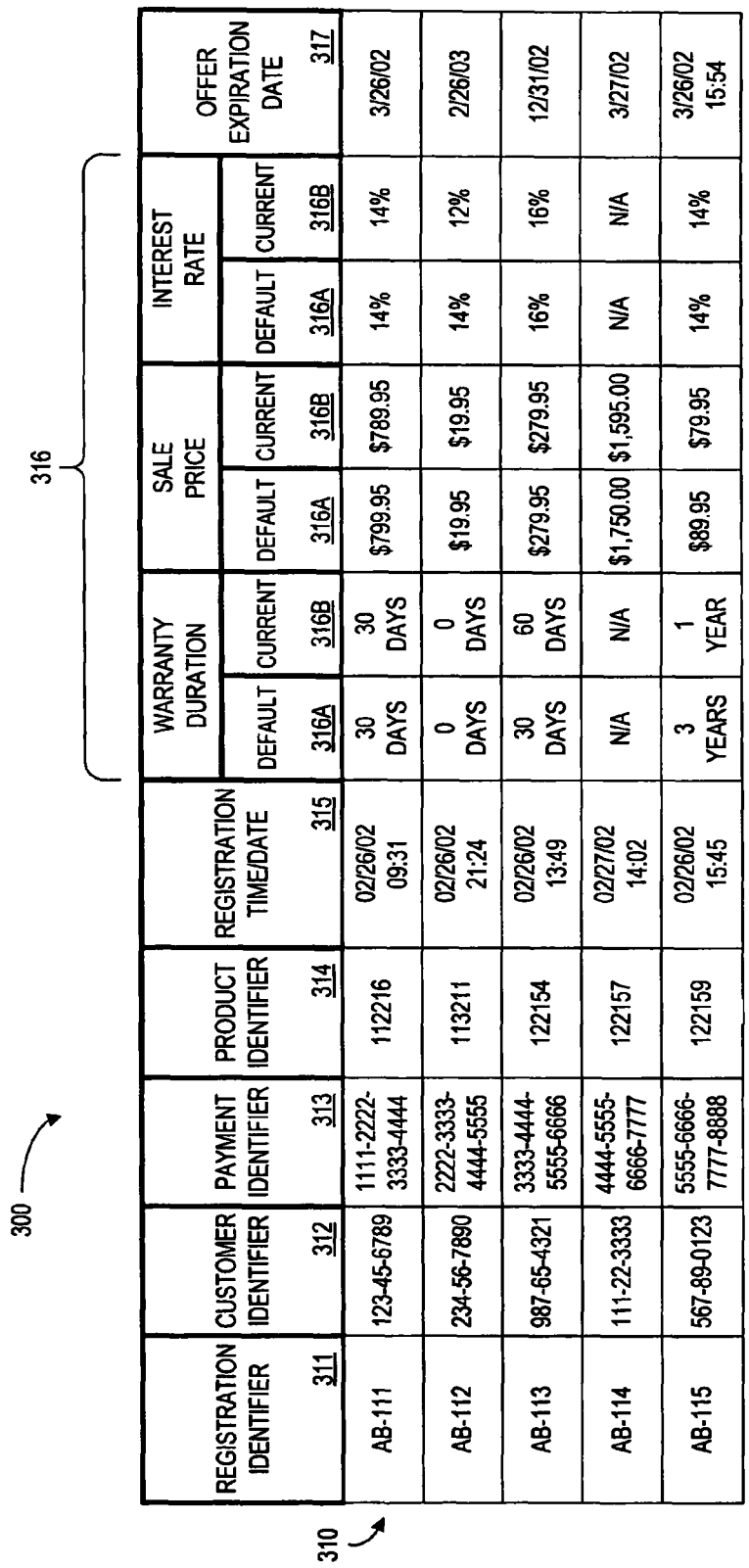
FIG. 3 is a tabular representation of one embodiment of the registration database shown in FIG. 2D.

FIG. 3 illustrates one embodiment of the registration database 300 shown in FIG. 2C. The registration database 300 stores one or more registration records 310, each having a registration identifier 311, a customer identifier 312, a payment identifier 313, a product identifier 314, a registration time/date field 315, one or more transaction terms 316 associated with each purchase transaction and an offer expiration date 317. A registration record is generated by the purchasing system and stored in the registration database 300 for each purchase transaction made in accordance with the present invention.

The registration record 310 includes a registration identifier 311 to facilitate the record's processing, storage, and retrieval. The registration identifier 311 may be an alphanumeric or other sequence that identifies a record in database 300. The customer identifier 312 may be an alphanumeric or other code that identifies the purchasing customer. The customer identifier 312 may be based on, for example, the customer's Social Security number or assigned frequent shopper number, a customer specified user name, etc. The payment identifier 313 identifies a payment type and/or account which has been authorized for use in accordance with the product's purchase. The payment identifier 313 may consist of an account number such as a credit, debit, or ATM card or a savings or checking account. According to another embodiment, when an account number is not used, such as in a cash transaction, the payment identifier 313 may consist of a code indicating the type and amount of the payment made. Payment may be made using traditional means such as currency, or with a credit, debit, or ATM card. According to one embodiment, payment may be made either locally or remotely using electronic or digital currency such as ECASH™ provided by Digicash, Inc. of Palo Alto, Calif.

Also included in each registration record 310 is a product identifier 314. The product identifier 314 identifies the purchased product and may be based on, for example, the manufacturer's serial number, the product's UPC code, or a system-assigned code that identifies a product or type of product. A registration time/date 315 may be included to record the date and/or time the purchase transaction was made. The registration time/date 315 may also be used to calculate the offer expiration date 317 (e.g., when the transaction terms should be finalized).

Each registration record 310 further includes one or more transaction terms 316 associated with the purchase. Exemplary transaction terms 316 may include the product's sale price, the offer period, interest rate, warranty provisions, or other terms for which the customer is given the opportunity to obtain a more competitive value. Note that different products or different customers may be associated with different types of transaction terms.

In one embodiment, each transaction term has a predefined default value 316a and a current value 316b. The default value 316a, such as the default price, represents the original value of the particular transaction term when the customer initially makes the purchase transaction and acquires the product. The current value 316b, such as a lower sale price, represents an updated value received after the product has been conveyed to the customer. As described above, a lower sale price, longer warranty period, lower interest rate, or other transaction term value or values may replace the default value if the new value is confirmed and received within an offer period in accordance with the post-acquisition process, one embodiment of which is illustrated in FIG. 1C.

Registration records 310 may be reviewed periodically to determine the purchasing profiles associated with specific customers. This information may be used to send or otherwise transmit sales announcement to select customers, thereby allowing a more targeted use of advertising efforts and expenditures. Additional information, such as whether the customer participated in a buyer protection program (e.g., a price protection program), transaction terms, and initial and final transaction term values may also be included in the customer record to more completely develop the customer's purchasing profile.

The registration database 300 may also be reviewed periodically to determine the sales volume of a particular products or categories of products. This information can be used to adjust the default value of transaction terms, for instance the sale price of a product, to increase or decrease sales activity.

Figure 4:
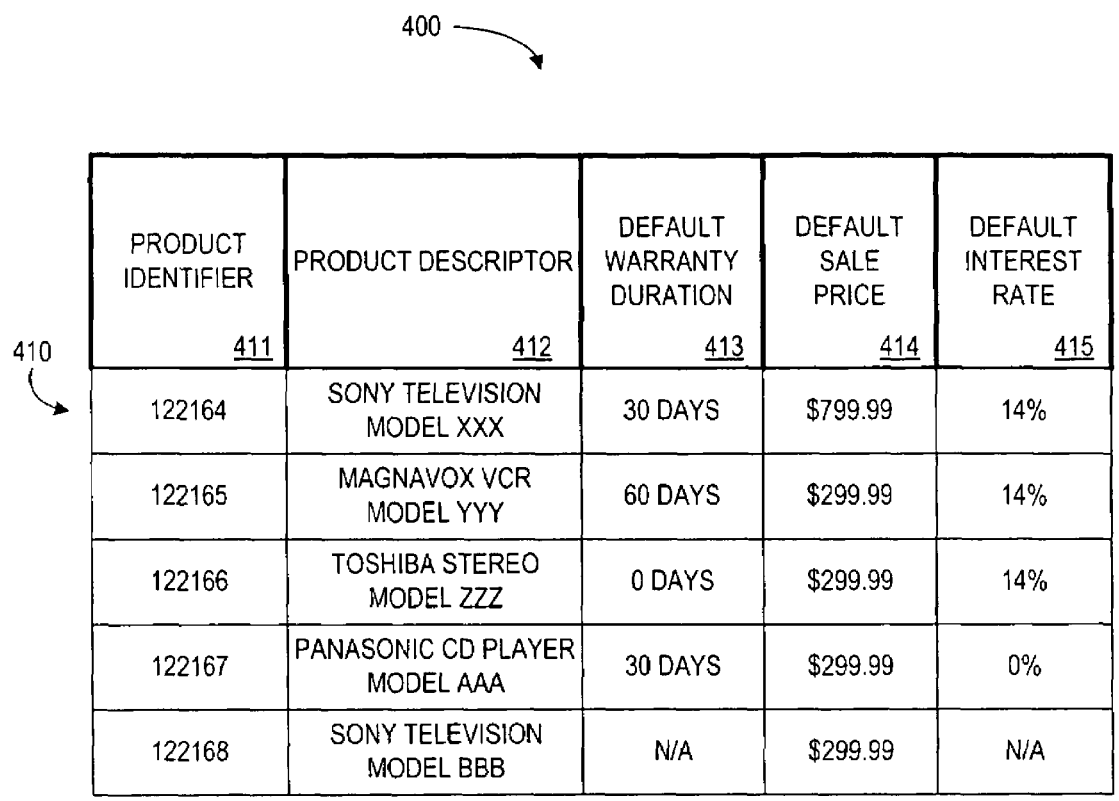
FIG. 4 is a tabular representation of one embodiment of the product database shown in FIG. 2D.

The data storage device 231 also includes a product database 400, an embodiment of which is illustrated in FIG. 4. Product database 400 stores one or more product records 410, each having a product identifier 411, described above, a product descriptor 412, a default warranty duration 413, a default sale price 414 and a default interest rate 415. A product record is generated by the purchasing system 200 and stored in the product database 400 for each transaction (e.g., each product sold to a customer).

As described above, the product identifier 411 is used to identify a purchased product and may consist of any unique sequence such as the manufacturer's serial number or the product's UPC code. The product descriptor 412 provides a general description of the purchased product such as the product type and/or model number. Of course, other descriptor formats are possible. Default transaction term value fields 413, 414, 415 may store data representing, for example, the price, offer period, and/or interest rate terms associated with the product identified in field 411 of the corresponding record. The default transaction term value field 413 may provide the original value of these terms to which the customer agrees in the absence of a received and confirmed alternative value. Other transaction terms may be included in addition to or in place of those illustrated in FIG. 4.

The data storage device 231 may further include a customer database 500, an embodiment of which is illustrated in FIG. 5. Customer database 500 stores one or more customer records 510. Each record 510 may contain a customer identifier 511, contact information 512, and a payment identifier 513. A customer record may be generated by the purchasing system and stored in the customer database 500 for customer.

The customer identifier 511 is a unique code used to identify the purchasing customer. The customer identifier may consist of any unique or system-assigned code, such as the customer's Social Security number or assigned frequent shopper number. Contact information 512 may include information such as the customer's name, residential and/or e-mail address, telephone number, etc. Payment identifier 513 identifies the payment type and/or account which has been authorized for the customer, as described above.

The data storage device 231 further includes a system program 600. The system program 600 contains computer-readable code which directs processor 235 to control the purchasing system 200 to perform the processes illustrated in FIGS. 1A-1C. The system program may be written in any conventional programming language, such as C++, and run on an operating system platform, such as WINDOWS® created by the Microsoft Corporation. Those skilled in the art will appreciate that other programming languages and/or operating systems are suitable for use in conjunction with the central server in accordance with the present invention.

ADDITIONAL EMBODIMENTS

Referring again to FIG. 3, note that a single product may be associated with a number of different transaction terms. For example, the product associated with entry 310 in the registration database 300 is initially associated with three default transaction term values: a warranty duration of 30 days, a sale price of $799.95 and an interest rate of 14%.

According to one embodiment of the present invention, a customer may provide an override value for any of the transaction terms on a "term-by-term" basis. For example, a customer may locate a competing product provider that offers the same product for sale with the following transaction term values: a warranty duration of 60 days, a sale price of $819.99 and an interest rate of 14%. According to this embodiment, the customer is allowed to submit the warranty duration by itself (i.e., and not the sale price) as an override value. That is, the customer can establish the following current transaction term values: a warranty duration of 60 days, a sale price of $799.95 and an interest rate of 14%.

According to another embodiment of the present invention, a customer can provide an override value for a transaction term only if all other transaction term values offered by the competing product provider are, for example, substantially similar to (or more competitive than) the default terms. In the above example, therefore, the customer would not be allowed to submit the 60 day warranty duration, because the competing product provider had a higher sale price for the product. According to this embodiment, the customer may be required to submit proof of all three transaction term values to the seller. The customer may instead be allowed to submit a single transaction term value, and the seller will then verify that the other transaction term values offered by the competing product provider are substantially similar to, or more competitive than, the default term values.

Similarly, according to an embodiment of the present invention a customer may provide a "set" of override values. That is, in the above example, the customer can submit the 60 day warranty duration—but must then also pay the higher $819.99 sale price for the product.

While the above is a complete description of specific embodiments of the invention, additional embodiments are also possible. For example, the aforementioned functions and hardware of the central server, POS terminal, and kiosk may be integrated within a single unit to provide the requisite functionality. Moreover, although specific databases and database arrangements have been described herein, it will be appreciated that any number of databases and database arrangements may be used in place thereof. It should be evident that the present invention is equally applicable by making appropriate modifications to the embodiments described above. Therefore, the above description should not be taken as limiting the scope of the invention which is defined by the metes and bounds of the appended claims.

What is claimed is:

1. An apparatus, comprising:
a processor;
a memory operable to communicate with the processor, the memory further operable with the processor to:
  receive, via a web interface of a first merchant and from a customer, a request to have a desired item shipped to the customer;
  identify a first price for which the item is being offered for sale by the merchant at the time of the request;
  determine a period of time associated with the item during which a second price may be determined for the item, the second price being lower than the first price, wherein the period of time has an expiration condition associated therewith which defines the end of the period of time;
  receive from the customer an indication of a financial account identifier identifying a financial account of the customer, the financial account identifier for use in charging only one of the first price or the second price to the financial account upon the expiration condition occurring;
  store an indication of the first price for the item in association with the financial account identifier;
  determine that the expiration condition has occurred;
  determine whether the second price for the item has been identified and verified prior to the occurrence of the expiration condition;
  and
  use the received financial account identifier to charge, upon the occurrence of the expiration condition and therefore only at the end of the period of time, only one of the first price or the second price to the financial account, such that only the second price and not the first price is charged to the financial account at the end of the period of time if the second price has been identified and verified prior to the occurrence of the expiration condition and only the first price and not the second price is charged to the financial account at the end of the period of time if the second price has not been identified and verified prior to the occurrence of the expiration condition.

2. The apparatus of claim 1, further comprising the processor being operable with the memory to determine a URL associated with the item.

3. The apparatus of claim 2, wherein the processor being operable with the memory to determine whether the second price for the item has been identified and verified comprises determining whether a second retail establishment which is offering the item for the second price has been contacted by accessing a web site of the second merchant and verifying the second price using the URL.

4. The apparatus of claim 1, wherein the first merchant is a competitor of a second merchant which offers the item for sale at the second price.

5. The apparatus of claim 1, wherein the apparatus is in communication with a credit authorization terminal of the first merchant.

6. The apparatus of claim 1, wherein receiving the request from the customer further causes the processor to:
  confirm the customer by comparing a received customer identifier with a stored customer identifier.

7. The apparatus of claim 1, wherein the item is conveyed to the customer before either the first price or the second price is charged to the financial account.

8. The apparatus of claim 1, wherein the processor is further operable with the memory to determine that the second price is within a predefined limit prior to verifying the second price.

9. The apparatus of claim 1, wherein the processor is further operable with the memory to:
  determine that the second price is below a predefined minimum value prior to verifying the second price; and
  to set the second price to the predefined minimum value if the second price is verified.

10. The apparatus of claim 1, wherein the customer is a frequent shopper.

11. A method comprising:
receiving, via a web interface of a first merchant and from a customer, a request to have a desired item shipped to the customer;
identifying a first price for which the item is being offered for sale by the merchant at the time of the request;
determining a period of time associated with the item during which a second price may be determined for the item, the second price being lower than the first price, wherein the period of time has an expiration condition associated therewith which defines the end of the period of time;
receiving from the customer an indication of a financial account identifier identifying a financial account of the customer, the financial account identifier for use in charging only one of the first price or the second price to the financial account upon the expiration condition occurring;
storing an indication of the first price for the item in association with the financial account identifier;
determining that the expiration condition has occurred;
determining whether the second price for the item has been identified and verified prior to the occurrence of the expiration condition;
and
use the received financial account identifier to charge, upon the occurrence of the expiration condition and therefore only at the end of the period of time, only one of the first price or the second price to the financial account, such that only the second price and not the first price is charged to the financial account at the end of the period of time if the second price has been identified and verified prior to the occurrence of the expiration condition and only the first price and not the second price is charged to the financial account at the end of the period of time if the second price has not been identified and verified prior to the occurrence of the expiration condition.

12. A non-transitory computer-readable medium storing instructions configured to cause a processor to:
receive, via a web interface of a first merchant and from a customer, a request to have a desired item shipped to the customer;
identify a first price for which the item is being offered for sale by the merchant at the time of the request;

determine a period of time associated with the item during which a second price may be determined for the item, the second price being lower than the first price, wherein the period of time has an expiration condition associated therewith which defines the end of the period of time;

receive from the customer an indication of a financial account identifier identifying a financial account of the customer, the financial account identifier for use in charging only one of the first price or the second price to the financial account upon the expiration condition occurring;

store an indication of the first price for the item in association with the financial account identifier;

determine that the expiration condition has occurred;

determine whether the second price for the item has been identified and verified prior to the occurrence of the expiration condition;

and use the received financial account identifier to charge, upon the occurrence of the expiration condition and therefore only at the end of the period of time, only one of the first price or the second price to the financial account, such that only the second price and not the first price is charged to the financial account at the end of the period of time if the second price has been identified and verified prior to the occurrence of the expiration condition and only the first price and not the second price is charged to the financial account at the end of the period of time if the second price has not been identified and verified prior to the occurrence of the expiration condition.

* * * * *